W. BECK.
PRESSED-GLASS BUCKET.

No. 180,452. Patented Aug. 1, 1876.

Witnesses
J. H. Connelly
Claudius L. Parker

Inventor
Washington Beck
By George H. Christy
his Atty.

United States Patent Office.

WASHINGTON BECK, OF PITTSBURG, PENNSYLVANIA.

IMPROVEMENT IN PRESSED-GLASS BUCKETS.

Specification forming part of Letters Patent No. 180,452, dated August 1, 1876; application filed May 17, 1876.

*To all whom it may concern:*

Be it known that I, WASHINGTON BECK, of Pittsburg, county of Allegheny, State of Pennsylvania, have invented or discovered a new and useful Improvement in Pressed-Glass Buckets; and I do hereby declare the following to be a full, clear, concise, and exact description thereof, reference being had to the accompanying drawing, making a part of this specification, in which—like letters indicating like parts—

Figure 1:
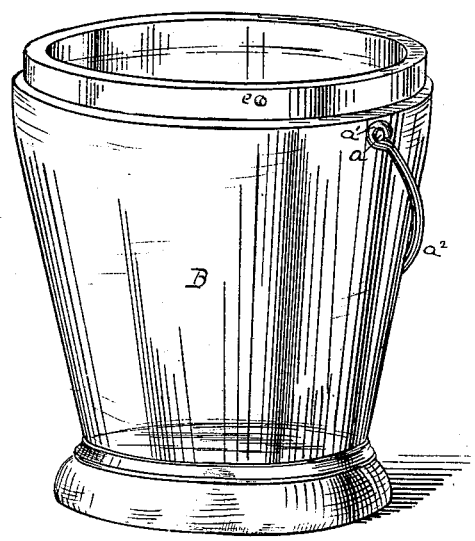
Figure 2:
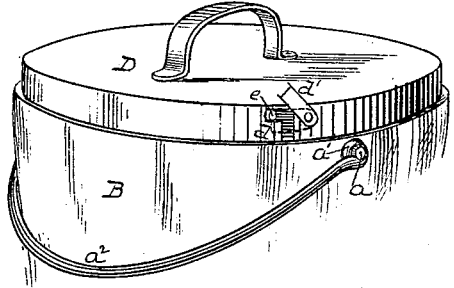
Figure 3:
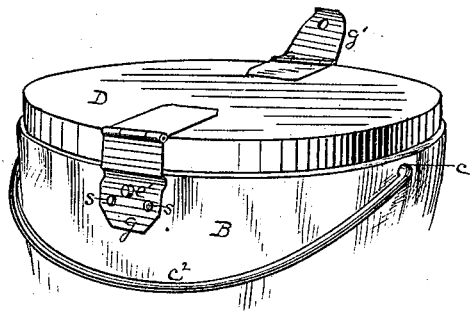

Figure 1 represents a perspective view of a pressed-glass pail or bucket and bails; and Figs. 2 and 3 are like views of the upper end of the same, with lids or covers and fastenings of the same.

For many purposes, a glass vessel, with a close well-fastened lid or cover, and a carrying-bail, is desirable, especially for packing, transporting, and handling such articles as butter, lard, fruits, &c.; and also without the lid or cover, as an article of ordinary domestic use, such articles have been made and used; but so far as I am aware they lacked, in each case, one or more of the elements which constitute the present invention, such elements being important and material.

In molds of suitable construction, I press the glass vessel B, both sides and bottom, of any desired size or capacity, and preferably of about the shape of an ordinary pail or bucket. By means of suitable recesses in or projections on the faces of the molds, I make, at the same time the vessel is made, and at the same operation, a bail-fastening, either in the form of projecting lugs $a$ or recesses $c$, as may be preferred, so that an eye, $a^1$, on each end of the bail $a^2$ may engage the lugs, as in Figs. 1 and 2; or the ends of the bail $c^2$ being bent inward may be sprung into the recesses $c$, as in Fig. 3, so as to engage the same with sufficient firmness or rigidity for practical use.

I make no claim to either of these bail-fastenings by themselves considered, but simply illustrate them as known equivalents of each other, and as suitable for the purpose in view.

The pail or bucket thus made may be used with or without a cover or lid, D; but when the device is to be packed with its contents for transportation a close-fitting secure cover is generally needed. When the pail or bucket is to be made for such use I also provide fastening attachments at the same time I make the vessel itself, and in the same operation.

These attachments may, as before, consist of glass lugs $e$, formed by suitable recesses in the molds, so as to interlock with the lid D by a bayonet-fastening, $d$, and hinged stop, $d'$, as in Fig. 2, or like lugs $e'$ may be made by like means in suitable position, as before, to engage the half of a hinge, $g$, as in Fig. 3, on one side, and a hasp, $g'$, on the other side; but in the latter case the hinge $g$ should be further secured by rivets $s$, for the insertion of which holes are made at suitable points by projections on or from the mold-faces, in like manner as already described with reference to the recesses $c$, or in other known manner.

I have described these alternative devices chiefly to illustrate that feature of my invention, in which the bail-fastening and cover-fastening devices, in so far as they constitute a part of the pail or bucket, are made at the same time, and by the same operation as the pail or bucket itself; and as regards this feature of my invention I hereby include, as the mechanical equivalents thereof, other suitable modes, known in the manufacture of pressed glassware, for pressing the bail-fastening and cover-fastening attachments simultaneously with the pressing of the pail or bucket itself, such as in cover-fastenings, screws, inclined lugs, &c.; but a pressed screw-thread or inclines, as parts of the vessel described, will be claimed in a separate application; also, a pouring-spout may be added in the manner usual in making glass pitchers; but the pressed-glass vessel herein set forth, made with a pouring-spout, will be, though within the scope of the present invention, separately claimed as an additional and further improvement.

I claim herein as my invention—

1. A pressed-glass pail or bucket, with pressed-bail attachments, substantially as described, as a new article of manufacture.

2. A pressed-glass pail or bucket, with pressed bail and cover attachments, substantially as described.

In testimony whereof I have hereunto set my hand.

WASHINGTON BECK.

Witnesses:
 JNO. A. WILSON,
 GEO. H. CHRISTY.